No. 632,540. Patented Sept. 5, 1899.
R. W. SAMPSON.
PUNCTURE CLOSER FOR PNEUMATIC TIRES.
(Application filed Dec. 8, 1898.)
(No Model.)
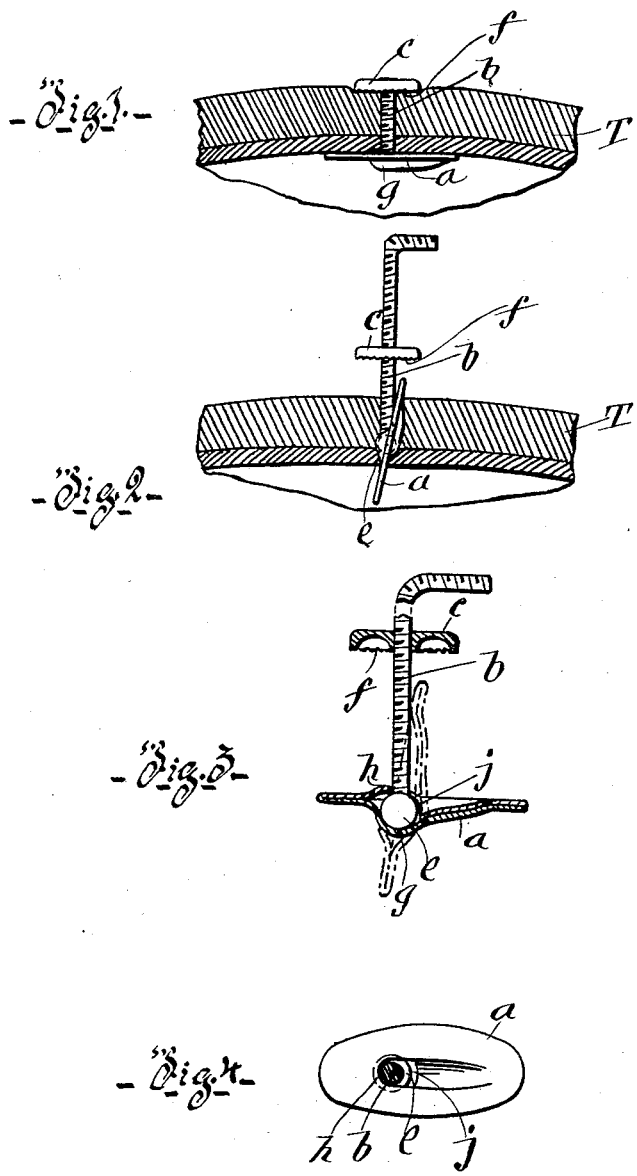

UNITED STATES PATENT OFFICE.

ROBERT WILLIAM SAMPSON, OF QUEBEC, CANADA.

PUNCTURE-CLOSER FOR PNEUMATIC TIRES.

SPECIFICATION forming part of Letters Patent No. 632,540, dated September 5, 1899.

Application filed December 8, 1898. Serial No. 698,665. (No model.)

*To all whom it may concern:*

Be it known that I, ROBERT WILLIAM SAMPSON, of the city of Quebec, Province of Quebec, Canada, have invented certain new and useful Improvements in Devices for Closing Punctures in Pneumatic Tires; and I do hereby declare that the following is a full, clear, and exact description of the same.

This invention relates to devices for effectually closing punctures and holes in pneumatic tires, hose, or tubing; and it has for its object the production of a simple, strong, and efficient puncture-closing device adapted to be readily and accurately applied, my invention being particularly adapted for closing holes and punctures in pneumatic vehicle-tires.

Rubber and other flexible plugs have been devised for closing punctures with the aid of cement; but such plugs are difficult to apply, and owing to their flexibility they frequently are so bent or folded as to render it practically impossible to at times effect a perfect closure. So, too, conical-headed plugs have been devised provided with a threaded shank to receive a cap, the material of the tire or tubing being held between the base of the cone and the cap, and flat caps having threaded shanks have also been devised. Such devices, however, are defective for the reason that the first mentioned tends to greatly enlarge the puncture, and the yielding material of the tubing will not fit tightly around the base of the plug, so that a tight closure cannot be effected, while the second-mentioned device is defective because a cap is required to be sunk into the outer cover of the tire, thus increasing the size of the hole and besides embodying a complicated construction. By my present invention I obviate the objectionable features of the flexible or metallic plugs referred to, and without the use of cement I am enabled to effect a tight and effective closure of a hole or puncture without increasing the size of the hole.

For full comprehension, however, of my invention reference must be had to the accompanying drawings, forming a part of this specification, wherein like symbols indicate corresponding parts, and in which—

Figure 1 represents, in cross-section and enlarged, a portion of tubing with my novel puncture-closer applied thereto. Fig. 2 is a like view showing the manner of inserting the device into the puncture. Fig. 3 is an enlarged side elevation, partly in section, of the plug; and Fig. 4 is a plan view of the head of my closing device with the shank shown in section.

My novel puncture-closing device comprises, essentially, a head $a$, preferably made of brass or other rigid material, a threaded shank $b$, to which the head is pivotally connected by a ball-and-socket joint, and a detachable cap or nut $c$, adapted to take over the shank $b$ and to bear upon the exterior of the tire or other tube, while the outer end of the shank is offset to form a temporary handle.

The cap or nut $c$ has the edge of its outer face rounded and its inner face provided with a serrated flange $f$, tending to lock it in place when screwed down into the rubber of the tire.

The head $a$ is of oval form and provided with a socket to receive the ball $e$ on the end of the shank $b$, such socket being usually formed by a depression $g$ from the inside of the head outward and an inside partial covering-strip $h$ for such depression, having a slot $j$ narrower than the ball $e$, but wide enough to accommodate the shank.

In order to apply the closing device to a punctured tire or other tube T, the head $a$, having been turned up against the shank, is forced edgewise through the hole or puncture into the interior of the tube. When the head $a$ is entirely within it, it can be readily turned on its pivot into position at right angles to the shank and by means of the shank (after the nut has been screwed down into contact with the tire) drawn up close against the inner surface of the tube, as in Fig. 1, with the shank in the hole or puncture. When the head $a$ has been drawn tightly up against the inside surface of the tire and the latter clamped firmly between the head and nut, that portion of the shank projecting out beyond the nut is filed off, leaving the device as shown in Fig. 1.

What I claim is as follows:

1. A puncture-closer for tubing comprising a shank; a head; a universal joint for connecting said head to said shank; said head having a slot extending from said universal joint and of sufficient width to accommodate said shank; and a coöperating retaining-cap, substantially as described.

2. A puncture-closer for tubing, consisting of the threaded shank, $b$, with its upper end offset to form a temporary handle and having a ball, $e$, formed upon its lower end; the head, $a$, formed with a socket to receive and loosely retain said ball, and the slot, $j$, narrower than the ball, $e$, and of sufficient width to accommodate the shank $b$; and the coöperating retaining-cap with serrated under surface substantially as described.

In testimony whereof I have affixed my signature in presence of two witnesses.

ROBERT WILLIAM SAMPSON.

Witnesses:
J. H. PARR,
ERNEST F. WÜSTETE.